Patented Jan. 19, 1926.

1,570,253

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS FOR THE MANUFACTURE OF SODIUM THIOSULPHATE.

No Drawing.    Application filed January 13, 1925.    Serial No. 2,169.

*To all whom it may concern:*

Be it known that I, HENRY HOWARD, a citizen of the United States, residing at Cleveland, in the county of Cuyahoga and State of Ohio, have invented certain new and useful Improvements in Processes for the Manufacture of Sodium Thiosulphate, of which the following is a specification.

This invention relates to an improved process for the manufacture of sodium thiosulphate.

The process at present generally employed for the commercial production of sodium thiosulphate consists in treating a solution of sodium carbonate with sulphur dioxid or a gas containing sulphur dioxid such as burner gases, and then digesting a mixture of the resulting solution of sodium sulphite with finely divided solid sulphur until the sulphite is converted to thiosulphate. This process is sometimes applied to the solutions occurring as a by-product of the sodium sulphide process which contain sodium carbonate, sodium sulphide and sodium sulphite.

The reactions involved in this process are as follows:

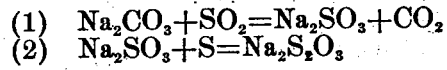

(1) $Na_2CO_3 + SO_2 = Na_2SO_3 + CO_2$
(2) $Na_2SO_3 + S = Na_2S_2O_3$

It has been proposed to carry out these reactions by treating a solution of sodium carbonate with finely divided solid sulphur and sulphur dioxid simultaneously, that is, by contacting a sulphur dioxid containing gas with a mixture of finely divided solid sulphur and sodium carbonate solution.

In such processes involving the use of solid sulphur the reaction rate is relatively slow and a comparatively large excess of the sulphur is used in order to complete the reaction in a reasonable length of time, and the excess of sulphur must be removed from the reaction mixture before the sodium thiosulphate is recovered.

It is also customary in the prior processes referred to to employ as the source of sulphur dioxid burner gases containing up to about 15% of sulphur dioxid as a maximum and to cool such gases prior to their introduction into the sodium carbonate solution in order to precipitate and remove from them any elemental sulphur present. Another feature of the prior processes is the concentration and filtration of the thiosulphate solutions to prepare them for the recovery of the thiosulphate in solid form by crystallization.

I have now found that sodium thiosulphate may be prepared and the disadvantages of the prior processes above referred to avoided by the use of sulphur in molecular or gaseous form. In accordance with my invention sodium sulphite prepared by the interaction of sodium carbonate and sulphur dioxid is treated with gaseous sulphur or sodium carbonate is treated with sulphur dioxid and gaseous sulphur simultaneously for instance by the use of a gas containing both sulphur dioxid and gaseous sulphur, such as may be obtained by burning elemental sulphur with a limited supply of air.

The following description of a preferred procedure in accordance with my invention will serve to illustrate the same, it being understood that the invention is not limited to the details of procedure presented.

A mixture of sulphur dioxid and gaseous sulphur containing about equal volumes of sulphur dioxid and elemental sulphur in gaseous form such as may be produced by operating an elemental sulphur burner with a limited supply of air is contacted in a suitable gas and liquid contact apparatus with water or preferably with a dilute solution of sodium thiosulphate such as a mother liquor or washings to which is added simultaneously a chemically equivalent proportion of sodium carbonate either in solid form or in aqueous solution. This procedure is continued with proper regulation of the sulphur, sulphur dioxid and sodium carbonate supplies until a reaction mixture of the desired sodium thiosulphate concentration is obtained. The process may be carried out in batch operation, in which case the reaction is stopped and thiosulphate recovered from the reaction mixture in the well known way or continuously, in which case a portion of the reaction mixture is continuously withdrawn while the reaction is in progress, the water so removed being replaced by water added, for instance, as such or in the form of weak thiosulphate solution or as a solution of the sodium carbonate.

In order that the sulphur may be introduced into the reaction mixture in molecular or gaseous form the gas containing it must be maintained at a temperature above the vaporization temperature of the sulphur. This may be accomplished by introducing the gas containing sulphur dioxid and sulphur generated in a sulphur burner directly into the reaction mixture without cooling. As a result of this procedure a considerable evaporation of water from the reaction mixture occurs. This feature of my process is of value not only in that it gives a relatively concentrated reaction mixture from which the thiosulphate may be crystallized directly or by the use of only a relatively small amount of heat for concentration, but further in that, in the specific case referred to in which a dilute thiosulphate solution from a prior operation is used as the reaction medium, the solution is concentrated by what otherwise would be waste heat. My process thus affords a very considerable economy in fuel. My process also eliminates the cooling of the burner gases and the treatment thereof for the removal of unburned sulphur and the use of the apparatus incident to these steps.

A further advantage of my process is that it makes possible the use of a gas of the maximum sulphur dioxid concentration producible by burning sulphur in air. This has several advantages: it reduces to a minimum the possibility of the oxidation of the solution as the oxygen content of the gas has been completely consumed by the sulphur which is in excess. This in turn means a substantial reduction in the volume of air required to burn the sulphur and a consequent saving in power for pumping that air. It also eliminates an apparatus for crushing and introducing sulphur directly to the tank as is generally customary, and owing to the smaller volume of the inert gases the absorption of the $SO_2$ is more complete.

I claim:—

1. In processes for the manufacture of sodium thiosulphate involving the interaction of sodium sulphite and elemental sulphur, the step which consists in delivering the sulphur to the reaction mixture in a state of molecular subdivision.

2. In processes for the manufacture of sodium thiosulphate involving the interaction of sodium sulphite with sulphur, the step which consists in supplying the sulphur for the reaction in gaseous form.

3. Process for the manufacture of sodium thiosulphate which comprises treating sodium carbonate with sulphur dioxid and gaseous sulphur.

4. Process for the manufacture of sodium thiosulphate which comprises contacting a gas containing sulphur dioxid and gaseous sulphur with a solution containing sodium carbonate.

5. Process for the manufacture of sodium thiosulphate which comprises contacting an aqueous liquid with sulphur dioxid and sulphur gases and supplying sodium carbonate thereto.

6. Process for the manufacture of sodium thiosulphate which comprises burning elemental sulphur with a limited supply of air to produce a gas containing about equal volumes of sulphur dioxid and gaseous sulphur and contacting said gas with a solution containing sodium carbonate.

In testimony whereof, I affix my signature.

HENRY HOWARD.